(12) United States Patent
Lange

(10) Patent No.: US 6,881,428 B2
(45) Date of Patent: Apr. 19, 2005

(54) PROCESS FOR MAKING A LACTOSE-FREE MILK AND MILK SO PROCESSED

(75) Inventor: Michel Lange, Frelighsburg (CA)

(73) Assignee: Agropur Cooperative, Quebec (CA)

( * ) Notice: Subject to any disclaimer, the term of this patent is extended or adjusted under 35 U.S.C. 154(b) by 0 days.

(21) Appl. No.: 10/121,581

(22) Filed: Apr. 15, 2002

(65) Prior Publication Data

US 2003/0031754 A1 Feb. 13, 2003

Related U.S. Application Data

(63) Continuation of application No. 09/890,399, filed as application No. PCT/CA00/00110 on Feb. 4, 2000, now abandoned.

(51) Int. Cl.[7] ................................................. A23C 9/12
(52) U.S. Cl. ........................... 426/42; 426/34; 426/422; 426/491; 426/519; 426/520
(58) Field of Search ............................ 426/34, 42, 580, 426/422, 478, 490, 491, 519, 520, 521, 522

(56) References Cited

U.S. PATENT DOCUMENTS

| | | |
|---|---|---|
| 4,529,611 A | 7/1985 | Utterwaal |
| 4,853,246 A | 8/1989 | Stevens |
| 4,956,186 A * | 9/1990 | Streiff et al. .................. 426/43 |

OTHER PUBLICATIONS

Gonzalez et al, 1994(04):P0108 FSTA, abstracting Alimentaria, 1993, No. 239, 67–71, abstract only.*

S. Poznanski, "Attempts to obtain yogurt with a decreased lactose content", ACTA Alimentaria Polonica, vol. IX, No. 1.

Rasic et al., Nutrient Yoghurt From Low Lactose Milk Using A Combined Lactase.

* cited by examiner

Primary Examiner—Leslie Wong
(74) Attorney, Agent, or Firm—Fish & Richardson P.C.

(57) ABSTRACT

This invention relates to a process for producing a lactose-free milk which does not confer a sweet taste to the milk normally resulting from the hydrolysis of lactose into monosaccharides. The process comprises the step of reducing the lactose content of the milk to about 3% prior to hydrolysis with lactase. When the milk is skimmed milk, the protein content may be increased to about 3.8–4.0% or greater, which further improves the organoleptic properties of the milk. Milk so processed and dairy products derived therefrom are also disclosed and claimed.

17 Claims, 1 Drawing Sheet

PROCESS FOR MAKING A LACTOSE-FREE MILK AND MILK SO PROCESSED

Figure 1:
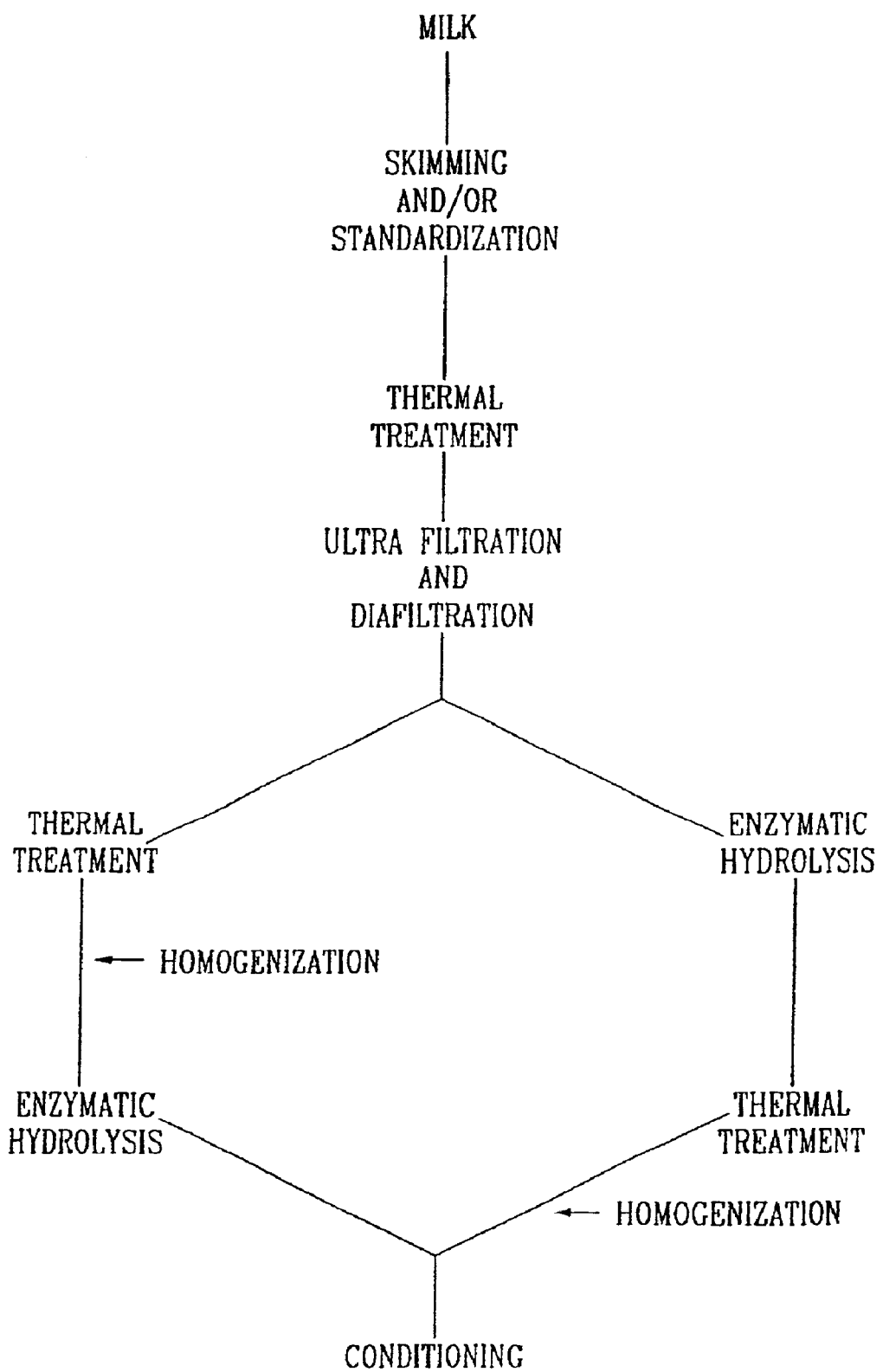

This application is a continuation of U.S. application Ser. No. 09/890,399, filed Jul. 31, 2001, now abandoned, which is a National Stage Filing of PCT/CA00/00110, filed Feb. 4, 200.

FIELD OF THE INVENTION

This invention relates to a process for reducing or substantially eliminating lactose from milk. This invention further relates to a lactose-free milk which has preserved organoleptic properties. This invention also relates to a partially or totally defatted and lactose-free milk which has preserved organoleptic properties.

BACKGROUND OF THE INVENTION

It is well known that some individuals are intolerant to lactose. Further, it may be desirable at certain times for individuals to avoid ingesting milk having a normal lactose content (about 4.6–4.9% w/v), particularly when the gastrointestinal epithelium is momentarily compromised in its capacity to convert lactose to the monosaccharides glucose and galactose. Such situations occur, for example, when an individual is afflicted with diarrhea, gastroenteritis or a gastrointestinal disorder caused by the administration of antibiotics. When the affected individual is a nursing infant, it may be necessary to substitute the mother's milk with a lactose-free milk. A soy based milk, which does not naturally comprise lactose, is an acceptable alternative under circumstances where lactose intolerance occurs or where lactose is to be avoided for a given period of time. However, many individuals reduce or eliminate milk consumption because they dislike the taste of soy-based milk.

Different approaches exist to modify the composition of milk. Enzymatic processes used to eliminate lactose from milk are well known in the art. They usually comprise the step of adding lactase to milk for a time sufficient to convert lactose into monosaccharides. The major problem occurring with this type of process is that the production of monosaccharides increases the taste of the milk to an unacceptably sweet level.

U.S. Pat. No. 4,957,752 describes a process for making an ultrafiltrated milk which is used in the production of kefir. A partial delactosylation is achieved which reduces the ratio of lactose to protein from about 1.5:1 to about 1:1 (measured as percentages on a dry weight basis). This reference does not identify any undesirable modifications of the organoleptic properties of milk so delactosylated and further treated with a lactase, and consequently does not provide solutions for solving the problem arising from the action of lactase.

U.S. Pat. No. 4,956,186 describes a process for making yogurt. This process also comprises the steps of ultrafiltering milk and hydrolysing lactose with a lactase. Apparently the sweet taste of the resulting milk was not a concern in this reference, because a sugar substitute was added to the yogurt.

There is therefore a need for an improved process for preparing lactose-free milk. In particular, there is a need for a process resulting in lactose-free milk whose organoleptic properties are not negatively affected.

SUMMARY OF THE INVENTION

The present invention provides a solution to the drawbacks or inconveniences of existing processes and milk products.

It is a first object of the invention to provide a process by which lactose is reduced or substantially eliminated from milk without negatively affecting the taste of the milk.

More particularly, a process is defined for producing a milk product which is substantially lactose-free from an original milk having original lactose and protein contents, which process comprises the steps of:

reducing the lactose content of said original milk to a content which represents a ratio of percentages lactose to protein of about 1:1 on a dry weight basis, so as to obtain a milk having a residual lactose content; and treating the milk having said residual lactose content with a lactase enzyme until conversion of lactose into galactose and glucose is substantially complete;

whereby a lactose-free milk is obtained without any substantial increase of the sweet taste thereof consequent to the conversion into galactose and glucose.

In a specific embodiment, the milk having a residual lactose content has about 3% lactose on a dry weight basis, and is obtained by membrane technology. Specifically, ultrafiltration and diafiltration were used.

In a more specific embodiment, the milk is standardized to achieve a fatty matter content of about 0 to about 3.25% on a dry weight basis.

In the first most specific embodiment, the fatty matter content is standardized to about 3.25%.

In the second most specific embodiment, the fatty matter content is standardized to about 0%. The above process leads to a fat-free and lactose-free product. In the latter case, the organoleptic properties of the skimmed milk so treated are improved by increasing the milk protein over the natural protein content of milk, preferably up to about 3.8–4.0% or greater on a dry weight basis.

The milk protein content may be increased by concentrating the original milk or by adding proteins to said original milk or to the milk having residual lactose content, or else to the milk treated with lactase. The added proteins may be milk proteins or proteins from any exogenous source.

It is a second object of the present invention to provide milk products produced by the above processes.

It is a third object of this invention to provide dairy products derived from the milks obtained in accordance with the present invention.

DESCRIPTION OF FIG. 1

FIG. 1 outlines the steps of a process according to the present invention.

DESCRIPTION OF THE PREFERRED EMBODIMENTS OF THE INVENTION

The invention will be now be described by referring to the preferred embodiments and FIG. 1.

The process begins with a cow milk, the lactose content of which is to be reduced from an original average value of 4.6–4.9% to a value below the detection level thereof, as verified by enzymatic assays (i.e., below about 0.2%). This is considered to be a substantially complete removal of lactose.

Materials and Methods

The protein content (N×6.38) and the total fat matter content were determined in duplicate using the standard method of Kjeldahl and Mojonnier, respectively.

The lactose content was measured by a technique well known in the art, such as Boehringer & Mannheim Enzymatic Method.

Total coliforms were quantified by the "most probable number" technique, which consists of counting bacteria following growth for 48 hours at 37° C. on Brilliant Green Medium.

To evaluate the number of total aerobic bacteria, incubation was performed for 48 hours at 32° C. on "plate count agar" medium.

These two methods for measuring bacterial contents are approved by the International Federation and the American Public Health Association.

Non-processed milk usually has the following average composition:

| | |
|---|---|
| Lactose | 4.6–4.9% |
| Fatty Matter | 3.6–3.8% |
| Proteins | 3.1–3.3% |
| pH | 6.6.–6.9% | and the total aerobic microbial flora should be less than about 100,000 cfu, for example, in order to comply with governmental regulatory standards.

EXAMPLE 1

Process for Making a Lactose-free Milk

The steps of the process of this invention will now be described with reference to FIG. 1.

The first step is a partial or total removal of fatty matter, or standardization, of the milk contents. Levels of fatty matter usually vary from 0 to 3.25% on a dry weight basis.

The second step of the present process is usually a thermal treatment. The goal of this step is two-fold: (1) to destroy pathogenic agents in the milk; and (2) to increase the permeation speed during the following ultrafiltration step, thereby reducing the clogging rate of the filtering walls.

Thermal treatment is not essential to the present invention if one or both of the above goals are not sought. In the present case, standardized milk having 3.25% fatty matter was heated at 72.8° C. for a period of 16 seconds. The pressure used for the heat treatment may vary upon the nature of the equipment and the method itself. Here, the equipment used was a Tetra Pak™ system and the parameters for heat treatment were chosen in accordance with the manufacturer's recommendations.

The heat-treated milk was allowed to cool down to the temperature used during the ultrafiltration step. Many other temperature and time schedules may be used in replacement of the one mentioned above, as may be appreciated by a person skilled in the art.

The third step is an ultrafiltration/diafiltration step. The filtration temperature is stabilized. The filtration temperature affects the permeation speed. An increase of 1° C. has the effect of increasing the permeation speed by about 2.5%. The filtration temperature should never exceed the maximum temperature suggested by the manufacturers of filtration membranes.

The filtration system used was Tetra Pak™ with Romicon™ PM50 filtration membranes and the filtration parameters were the following:

| | |
|---|---|
| Temperature | ≧50° C. |
| Transmembrane pression | 1.0 Bar |
| Velocity | ≧7 meters/second |
| Permeation speed | 30 L/m²/hre |

During the ultrafiltration step, the retentate is submitted to diafiltration by addition of water so as to decrease the lactose content from about 4.6–4.9% to about 3%. At this concentration, the content ratio of lactose to protein is about 1:1. The reduction of the lactose content or ratio is a key feature of the present invention. When the lactose content is reduced to about 3% and the protein content is of about the same percentage value (on average, about 3.1–3.3%), and further, when the fatty matter content is of about 3.25%, the conversion of the residual lactose into monosaccharides will result in the production of a milk with an unnoticeable change in sweetness.

As may be seen from FIG. 1, the order of the subsequent fourth and fifth steps comprising thermal treatment and enzymatic hydrolysis may be interchanged. In both cases, the objective of the thermal treatment is to destroy pathogens and is based upon the intensity and the time selected for the heat treatment. The heat intensity influences the organoleptic and nutritional properties of the finished product and its conservation time. For example, a low temperature/long time process (LTLT) consists of heating at 65.6° C. for 30 minutes. The high temperature/short time (HTST) process consists of heating at about 72.8° C. for about 16 seconds. The ultrahigh temperature process (UHT) consists of heating at 120° C. for only a few seconds. In the present example, the heat treatment UHT was selected to ensure sterility for commercial purposes (see above parameters). It is worthwhile noting that LTLT and UHT have a more pronounced denaturing effect on proteins than the HTST heat process. The HTST heat treatment was combined

TABLE

| | 1) Heat treatment<br>2) Enzymatic hydrolysis | 1) Enzymatic hydrolysis<br>2) Heat treatment |
|---|---|---|
| Incubation time | 24–48 hres | 24–48 hrs |
| Temperature | *<5° C. | <10° C. |

*The incubation temperature is decreased when the product is non-sterile after heat treatment because of the introduction of the enzyme.

The last step of the above process is a usual conditioning step which is performed in accordance with available equipment. In the present case, the EQ5 process was used.

Homogenization ensures proper dispersion of fatty matter in the aqueous phase. The diameter of fat vesicles resulting from homogenization should be less than about 1 micron in order to avoid separating the lipidic and aqueous phases.

The final product may be aromatized by adding any flavor, or further processed.

EXAMPLE 2

Evaluation of Organoleptic Properties of the Milk Product Made Following the Procedure of Example 1

The organoleptic properties of the milk produced by the process of Example 1 were evaluated using a taste test. Individuals who tasted the milk did not discern an unpleasant taste.

EXAMPLE 3

Improvement of the Organoleptic Properties of a Fat-free, Lactose-free Milk

The steps of Example 1 were reproduced starting with an original milk having a fatty matter standardized to about 0%. The watery and sweet taste of the skimmed milk so-treated may be greatly improved by increasing the concentration of protein from about 3% (i.e., 3.1 to 3.3%) to about 3.8–4.0% or greater. This increase was achieved during the ultrafiltration/diafiltration step performed on the original milk (i.e., by concentrating milk proteins). Alternatively, proteins may be added at any step, such as after diafiltration or after complete hydrolysis of lactose. This simple increase in proteins rendered the fat-free and lactose-free milk significantly more acceptable to consumers involved in taste trials.

EXAMPLE 4

Dairy Products Derived from the Lactose-free Milk

A plurality of dairy products may be derived from the milk produced in accordance with the present invention. "Derived" should be construed as "obtained by milk transformation or as a milk-comprising food product". Any such dairy product (cream, ice cream, yogurt, butter, cheese, beverage etc.) is contemplated as being under the scope of the invention.

This invention has been described with reference to specific embodiments. It is well within the ability of the skilled artisan to make modifications without departing from the above teachings. These modifications are within the scope of this invention as defined in the appended claims.

What is claimed is:

1. A process for producing milk that is substantially lactose-free, which process comprises the steps of:
    a) Standardizing the fatty matter from an original milk so as to obtain a milk having a fatty matter content of between 0 and 3.25% on a weight basis;
    b) Passing the reduced-fat milk of a) through a membrane system so as to decrease the lactose content of said milk to approximately 3% on a weight basis;
    c) Subjecting the milk resulting from b) to thermal treatment; and
    d) Submitting the milk resulting from c) to enzymatic hydrolysis.

2. A process as defined in claim 1, further comprising a thermal treatment step between a) and b).

3. A process as defined in claim 1, further comprising a homogenization step following the thermal treatment of c).

4. A process as defined in claims 1, further comprising a conditioning step following d).

5. A process as defined in claim 4, wherein said conditioning step comprises aromatizing the final milk product.

6. A process as defined in claim 1, wherein said enzyme hydrolysis is achieved with a lactase enzyme until conversion of lactose into glucose and galactose is substantially complete.

7. A process as defined in claim 1, wherein said membrane system in b) is comprised of ultrafiltration followed by diafiltration.

8. A process as defined in claim 1, further comprising the step of increasing the milk protein content in the final milk to about 3.8–4.0% or greater on a weight basis.

9. A process as defined in claim 8, wherein said step of increasing the milk protein comprises adding milk proteins to said original milk following any step of said process.

10. A process as defined in claim 2, further comprising a conditioning step following d).

11. A process as defined in claim 10, wherein said conditioning step comprises aromatizing the final milk product by adding a flavor or by further processing.

12. A process as defined in claim 2, further comprising a homogenization step following the thermal treatment of c).

13. A process as defined in claim 12, further comprising a conditioning step following d).

14. A process as defined in claim 13, wherein said conditioning step comprises aromatizing the final milk product by adding a flavor or by further processing.

15. A process as defined in claim 5, wherein said aromatizing comprises adding a flavor.

16. A process as defined in claim 8, wherein said step of increasing the milk protein comprises concentrating original milk proteins through ultrafiltration followed by diafiltration in b) of said process.

17. A process for producing milk that is substantially lactose-free, which process comprises the steps of:
    a) standardizing the fatty matter from an original milk so as to obtain a milk having a fatty matter content of between 0 and 3.25% on a weight basis;
    b) passing the reduced-fat milk of a) through a membrane system so as to decrease the lactose content of said milk to approximately 3% on a weight basis;
    c) submitting the milk resulting from b) to enzymatic hydrolysis; and
    d) subjecting the milk resulting from c) to thermal treatment.

* * * * *